United States Patent
Hrivnak et al.

(10) Patent No.: US 6,248,823 B1
(45) Date of Patent: Jun. 19, 2001

(54) SOLVENTS FOR AMORPHOUS FLUOROPOLYMERS

(75) Inventors: Jeffrey A. Hrivnak, Glen Mills, PA (US); Walter Mahler, Wilmington, DE (US); William George O'Brien, Newark, DE (US); Viacheslav Alexandrovich Petrov, Hockessin, DE (US); Robert Clayton Wheland, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/338,149

(22) Filed: Jun. 23, 1999

Related U.S. Application Data

(60) Provisional application No. 60/091,494, filed on Jul. 2, 1998.

(51) Int. Cl.$^7$ .............................. C08L 27/12; C08L 27/18; C08L 27/20
(52) U.S. Cl. .................. 524/462; 524/544; 524/545; 524/546
(58) Field of Search .................... 524/462, 544, 524/545, 546

(56) References Cited

U.S. PATENT DOCUMENTS

| | | | |
|---|---|---|---|
| 5,182,342 | 1/1993 | Feiring et al. | 526/206 |
| 5,268,411 | 12/1993 | Yokotsuka et al. | 524/462 |
| 5,637,663 | 6/1997 | Anolick et al. | 526/254 |

FOREIGN PATENT DOCUMENTS

| | | | |
|---|---|---|---|
| 0803557 A1 | 10/1997 | (EP) | C09D/145/00 |

OTHER PUBLICATIONS

Patent Abstracts of Japan, Publication Number 07278314, Publication Date Oct. 24, 1995.
Patent Abstracts of Japan, Publication Number 05140400, Publication Date: Jun. 8, 1993.

*Primary Examiner*—Fred Zitomer

(57) ABSTRACT

Disclosed is a liquid/gelatinous composition of matter comprising:
(a) a solvent or a mixture of solvents selected from the group consisting of:
  (i) a $C_nF_{2n+2-x}H_x$ compound, wherein n is an integer from 6 to 15 and x is an integer from 1 to 3; and
  (ii) a $C_{n'}F_{2n'-x'}H_{x'}$ compound, wherein n' is an integer from 7 to 15 and x' is an integer from 1 to 3; and
(b) one or more amorphous fluoropolymers selected from the group consisting of:
  (i) poly(HFP/TFE);
  (ii) iodine ended poly(TFE/PMVE);
  (iii) poly(TFE/PMVE/PEVE);
  (iv) poly(TFE/PDD);
  (v) poly(TFE/perfluorovinylether);
  (vi) poly($CF_2$=$CF(CF_2)_2OCF$=$CF_2$/TFE); and
  (vii) poly(TFE/$CF_2$=$\overset{\underset{|}{CF_3}}{C}FOCF_2CFOCF_2CF_2SO_2F$)

wherein the amorphous fluoropolymer has no detectable Tm (<1 J/g) by differential scanning calorimetry and wherein the amorphous fluoropolymer makes up 0.05 to 30 wt % of the composition and wherein at least 5% of the amorphous fluoropolymer present is in solution in the solvent or mixture of solvents.

8 Claims, 1 Drawing Sheet

Viscosity vs. Solids Content for Teflon® AF 1601 in Three Solvents

SOLVENTS FOR AMORPHOUS FLUOROPOLYMERS

FIELD OF THE INVENTION

This application claims benefit of U.S. Provisional Ser. No. 60/091,494 filed Jul. 2, 1998.

This invention concerns a composition comprising amorphous fluorine-containing copolymers at least partially dissolved in a hydrofluorocarbon fluid.

TECHNICAL BACKGROUND OF THE INVENTION

Fluoroproducts are useful as deposits in the form of thin films or coatings. To provide these coatings in a form that can be sprayed or spin or dip coated on a substrate, it is necessary to dissolve amorphous fluoropolymers in suitable solvents. Many fluorocarbon fluids have been reported as solvents for amorphous perfluoropolymers. For example, U.S. Pat. No. 5,637,663 identifies perfluorodialkylsulfides, perfluorodialkylsulfones, perfluoroalkylsulfonyl fluorides, perfluorocarbons, perfluorobenzene, and perfluorobutyltetrahydrofuran as solvents for amorphous poly (hexafluoropropene/tetrafluyoroethylene) [poly(HFP/TFE)]. U.S. Pat. No. 5,637,663 also reports that the hydrofluorocarbon $CF_3CFHCFHCF_2CF_3$ is a nonsolvent for poly(HFP/TFE). In EP 0803 557 A1, Ausimont reports the use of perfluoropolyethers and perfluoroamines containing $-OCF_2H$, $-OCF(CF_3)H$, $-OCF_2CF_2H$, and $OCF(CF_2H)CF_3$ groups as solvents for amorphous polymers containing the dioxole monomer,

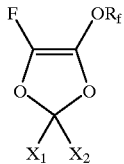

Except for the perfluorocarbons, the heretofore disclosed solvents contain oxygen or nitrogen heteroatoms.

The present invention is a coatable composition comprising amorphous fluorine-containing copolymers at least partially dissolved in a selected hydrofluorocarbon fluid.

SUMMARY OF THE INVENTION

This invention provides a liquid/gelatinous composition of matter comprising:

(a) a solvent or a mixture of solvents selected from the group consisting of:
  (i) a $C_nF_{2n+2-x}H_x$ compound, wherein n is an integer from 6 to 15 and x is an integer from 1 to 3;
  (ii) a $C_{n'}F_{2n'-x'}H_{x'}$ compound, wherein n' is an integer from 7 to 15 and x' is an integer from 1 to 3; and
(b) one or more amorphous fluoropolymers selected from the group consisting of:
  (i) poly(HFP/TFE);
  (ii) iodine ended poly(TFE/PMVE);
  (iii) poly(TFE/PMVE/PEVE);
  (iv) poly(TFE/PDD);
  (v) poly(TFE/perfluorovinylether);
  (vi) poly($CF_2$=$CF(CF_2)_2OCF$=$CF_2$/TFE); and (vii) poly(TFE/$CF_2$=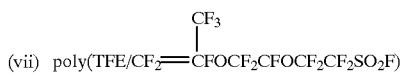)

wherein fluoropolymer has no detectable Tm (<1 J/g) by differential scanning calorimetry and wherein the amorphous fluoropolymer makes up 0.05 to 30 wt % of the composition and wherein at least 5% of the amorphous fluoropolymer present is in solution in the solvent or mixture of solvents.

In a preferred embodiment the amorphous copolymer makes up about 0.5 to 10 wt % of the mixture, and most preferably about 1 to 5 wt % of the mixture.

DETAILED DESCRIPTION OF THE INVENTION

Figure 1:
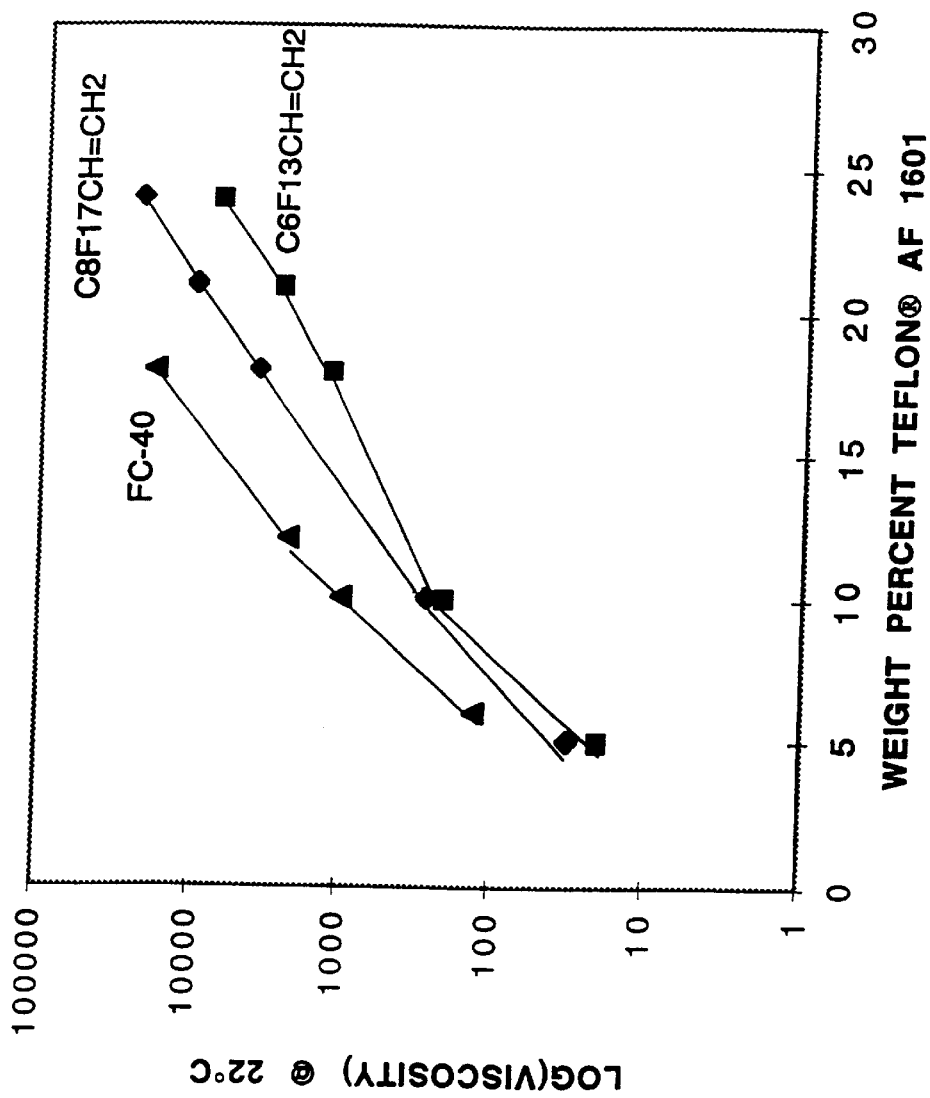
FIG. 1 is a plot of viscosity versus solids content for Teflon®.

HFC alkanes $C_nF_{2n+2-x}H_x$, wherein x is 1 to 3, and n is 6 to 15 and HFC alkenes $C_{n'}F_{2n'-x'}H_{x'}$ wherein x' is 1 to 3 and n' is 7 to 15, give partial to complete solution of amorphous perfluoropolymers at room temperature. In this description, the following abbreviations are used:

TFE tetrafluoroethylene
HFP hexafluoropropene
PMVE perfluoro (methyl vinyl ether)
PEVE perfluoro (ethyl vinyl ether)
PDD perfluoro (dimethyldioxole)

PSEVPE 

Solvents useful in the present invention, as indicated above, are selected from two groups of solvents. The first group are alkanes, $C_nF_{2n+2-x}H_x$ compounds, wherein n is an integer from 6 to 15 and x is an integer from 1 to 3. Preferred members of this group of solvents include (i) $CF_3(CF_2)_mH$ compounds, wherein m is an integer from 5 to 9; and (ii) $F(CF_2)_q(CFHCFH)(CF_2)_rF$ compounds, wherein q and r are each integers such that the sum q+r is equal to 5 to 13. A second group of solvents are alkenes, $C_{n'}F_{2n'-x'}H_{x'}$ compounds, wherein n' is an integer from 7 to 15 and x' is an integer from 1 to 3. Referred members of this group are those wherein the hydrogen atoms are bound to the carbon atoms of the olefinic double bond. Specifically preferred compounds of this second group are (i) $C_{m'}F_{2m'+1}CH$=$CH_2$ compounds, wherein m' is an integer from 6 to 12;
(ii) $(C_2F_5)_2C$=$CH(CF_2)_sCF_3$ compounds, wherein s is an integer from 2 to 4; and
(iii) $F(CF_2)_{q'}CH$=$CH(CF_2)_rCF_3$ compound, wherein q' and r' are each integers such that the sum q'+r' is equal to 8 to 12.

Amorphous perfluorinated copolymers suitable for use in the present invention include Teflon® AF [poly(tetrafluoroethylene/perflurorodimethyldioxole)], Teflon® SF-60 [poly(tetrafluoroethylene/perfluoromethylvinyl ether/perfluoroethylvinyl ether)], Teflon® SF-50 [poly(tetrafluoroethylene/hexafluoropropylene)], iodine ended poly(tetrafluoroethylene/PMVE) [Kalrez® 4000] (Teflon® SF-50 and SF-60 and Kalrez® 4000 are available from E. I. du Pont de Nemours and Company, Wilmington, Del. 19898) and Asahi Glass's Cytop® poly[tetrafluoroethylene/perfluoro(butenyl vinyl ether)] is available from Asahi Glass, and the sulfonyl fluoride form of Nafion® [poly(TFE/PSEPVE)]. Similar amorphous fluoropolymers are expected to be useful in the present invention.

The definition of HFC alkanes and alkenes provided above provides a prescription for where to look for amorphous fluoropolymer solubility. Claimed herein are the liquid to gelatinous compositions of matter that result when selected hydrofluorocarbons are mixed with selected amorphous fluoropolymers. The selected ranges have been chosen to give a high probability of useful solution formation, but it is recognized that not every combination will provide for complete solubility.

Attractive combinations can be identified by rolling a vial containing 0.1 g polymer and 1 ml of candidate solvent for 2 to 48 hours at room temperature. This often gives a clear solution, but one that may be too concentrated for the preparation of very thin films or one that is too viscous for spin, spray, dip, or print coating of fluoropolymer on substrate. Such a solution can always be diluted down with additional solvent. When the 0.1 g polymer sample does not dissolve in 1 ml of candidate solvent, additional solvent can be added although dilutions much beyond 10 to 20 ml (1 to 0.5% polymer, w/v) are generally of limited interest. In the case of difficulty soluble polymers, polymer/solvent mixtures can also be refluxed for about a day or ultrasonicated while heating.

Small amounts of other monomers (<1 to 5 mole percent), even of partially or nonfluorinated monomers such as VF2, VF, and ethylene, would not be expected to significantly alter the solubility trends reported here.

The hydrofluorocarbon solutions of amorphous fluoropolymers taught herein can be diluted down with small quantities of common hydrocarbon cosolvents such as methyl ethyl ketone and isopropanol for the purpose of modifying polymer/substrate adhesion.

As noted below in the Comparative Examples, not all hydrofluorocarbon fluids are equally effective. It has been found that a solvent selection has to be made in the direction of choosing higher molecular weight hydrofluorocarbons having a high ratio of fluorine to hydrogen.

The utility of the compositions disclosed herein is in the preparation of thin films of the amorphous fluoropolymers by spraying, spin coating, dip coating or other film forming techniques. An advantage of the hydrofluorocarbon fluid compositions taught herein is their environmental friendliness.

EXAMPLES

Comparative Example
HFC Nonsolvents

Glass vials were loaded with poly(HFP/TFE) and solvent. Rolling the vials for >24 hours room temperature caused polymer swelling rather than solution.

TABLE 1

| Solvent | Polymer |
|---|---|
| 1 ml $H(CF_2)_4H$ | 0.1 g Poly(HFP/TFE)[1] |
| 1 ml $HCF_2CF_2CH_2OH$ | 0.1 g Poly(HFP/TFE)[1] |
| 1 ml $HCF_2CF_2CH_2OCF_2CF_2H$ | 0.1 g Poly(HFP/TFE)[1] |
| 1 ml m-$(CF_3)_2C_6H_4$ | 0.1 g Poly(HFP/TFE)[2] |
| 1 ml $CF_3CF_2CF_2CF_2CH=CH_2$ | 0.1 g Poly(HFP/TFE)[2] |
| 1 ml $CF_3CFHCFHCF_2CF_3$ | 0.1 g Poly(TFE/PMVE)[3] |
| 1 ml $CF_3CF_2CF_2OCFHCF_3$ | 0.1 g Poly(TFE/PMVE)[3] |
| 1 ml $CF_3CF_2CF_2OCCF(CF_3)OCCFHCF_3$ | 0.1 g Poly(TFE/PMVE)[3] |
| 1 ml $H(CF_2)_4H$ | 0.1 g Poly(TFE/PMVE)[3] |
| 1 ml $CF_3CF_2CF_2CF_2CH=CH_2$ | 0.1 g Poly(TFE/PMVE)[3] |
| 1 ml $CF_3CF_2CF_2OCFHCF_3$ | 0.1 g Teflon ® AF 2400 |
| 1 ml $CF_3CF_2CF_2OCCF(CF_3)OCCFHCF_3$ | 0.1 g Teflon ® AF 2400 |
| 1 ml $CF_3CFHCFHCF_2CF_3$ | 0.1 g Teflon ® AF 2400 |
| 1 ml $CF_3CF_2CF_2CF_2CH=CH_2$ | 0.1 g Teflon ® AF 2400 |

Notes to Table 1:
[1] Poly(HFP/TFE): 58.0 wt % HFP; $M_w$ = 362,000; $M_n$ = 214,000, $n_{inh}$ = 0.39 dl/g @ 25° C. in FC-75 solvent.
[2] Poly(HFP/TFE): 56.6 wt % HFP; $M_w$ = 338,000; $M_n$ = 187,000, $n_{inh}$ = 0.45 dl/g @ 25° C. in FC 75 solvent.
[3] Poly(TFE/PMVE), iodine ended tetrafluoroethylene/perfluoro(methyl vinyl ether copolymer)

While partial solution may have occurred with some of these mixtures in these comparative examples, none of the potential solvents listed gave an attractive solution with any of the amorphous perfluoropolymers tested.

Example 1

1-H-Perfluorohexane

Glass vials were loaded with 0.1 g polymer and 1 ml of 1-H-perfluorohexane. The vials were rolled at room temperature. If solution was not achieved after 1 to 2 days of rolling, additional solvent was added as recorded in the table below:

TABLE 2

| Polymer | Result |
|---|---|
| Teflon ® AF 2400 | Hazy solution with 5 ml $C_6F_{13}H$ |
| Poly(TFE/PMVE)[1] | Clear solution with 2 ml $C_6F_{13}H$ |
| Poly(HFP/TFE)[2] | Clear solution with 5 ml $C_6F_{13}H$ |
| Poly(HFP/TFE)[4] | Clear solution with 1 ml $C_6F_{13}H$ |
| Cytop CTX-107[3] | Clear solution |

Notes to Table 2
[1] Poly(TFE/PMVE), iodine ended tetrafluoroethylene/perfluoro(methyl vinyl ether copolymer)
[2] Poly(HFP/TFE): 58.0 wt % HFP; $M_w$ = 362,000; $M_n$ = 214,000, $n_{inh}$ = 0.39 dl/g @ 25° C. in FC-75 solvent.
[3] Cytop ® CTX-107 is thought to be a copolymer of tetrafluoroethylene with perfluoro(butenyl vinyl ether)
[4] Poly(HFP/TFE): 56.6 wt % HFP; $M_w$ = 338,000; $M_n$ = 187,000, $n_{inh}$ = 0.45 dl/g @ 25° C. in FC-75 solvent.

Example 2

1-H-Perfluorooctane

Glass vials were loaded with 0.1 g polymer and 1 ml of 1-H-perfluorooctane. The vials were rolled at room temperature. If solution was not achieved after 1 to 2 days of rolling, additional solvent was added as recorded in the table below:

TABLE 3

| Polymer | Result |
|---|---|
| Teflon ® AF 2400 | Solution + trace gel with 4 ml $C_8F_{17}H$ |
| Poly(TFE/PMVE)[1] | Clear solution |
| Poly(HFP/TFE)[2] | Clear solution |
| Cytop CTX-107[3] | Clear solution |

Notes to Table 3
[1]Poly(TFE/PMVB), iodine ended tetrafluoroethylene/perfluoro(methyl vinyl ether copolymer)
[2]Poly(HFP/TFE): 58.0 wt % HFP; $M_w$ = 362,000; $M_n$ = 214,000, $n_{inh}$ = 0.39 dl/g @ 25° C. in FC-75 solvent.
[3]Cytop ® CTX-107 is thought to be a copolymer of tetrafluoroethylene with perfluoro(butenyl vinyl ether)

Example 3

5,6-Dihydroperfluoro-5-decene

Glass vials were loaded with 0.1 g polymer and 1 ml of 5,6-dihydroperfluoro-5-decene. The vials were rolled at room temperature. If solution was not achieved after 1 to 2 days of rolling, additional solvent was added as recorded in the table below:

TABLE 4

| Polymer | Result |
|---|---|
| Teflon ® AF 1601 | Hazy solution |
| Teflon ® AF 2400 | Gel |
| Poly(TFE/PMVE)[1] | Hazy solution + gel with 5 ml $C_4F_9CH\!=\!CHC_4F_9$ |
| Poly(HFP/TFE)[2] | Hazy solution 24 hours |

Notes to Table 4
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000: $M_n$ = 187,000, $n_{inh}$ = 0.45 dl/g @ 25° C. in FC-75 solvent

Example 4

$C_nF_{2n}H_2$

A. Dihydroperfluoroheptane, $C_7F_{14}H_2$[4]

Glass vials were loaded with 0.2 g polymer and 2 ml of dihydroperfluoroheptane, $C_7F_{14}H_2$. The vials were rolled for seven days at room temperature with the results recorded in the table below:

TABLE 5

| Polymer | Result |
|---|---|
| Poly(TFE/PMVE)[1] | Gel |
| Poly(HFP/TFE)[2] | Gel |
| Cytop CTX-107[3] | Gel |

Notes to Table 5
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000; $M_n$ = 187,000, $n_{inh}$ = 0.45 dl/g @ 25° C. in FC-75 solvent.
[3]Cytop ® CTX-107 is thought to be a copolymer of tetrafluoroethylene with perfluoro(butenyl vinyl ether)
[4]Approximately 88% $C_7F_{14}H_2$ and 12% $C_7F_{13}H_3$ It has proven somewhat difficult to quantify the amount of polymer in solution when gel is present because the gel plugs filters and does not cleanly separate with centrifugation. In one case described here the gel ended up as a discrete film on the walls of the vial and the solution portion could be cleanly decanted. A tared vial was loaded with 0.1058 g of poly(HTP/TFE) and 1 ml of $C_7F_{14}H_2$ (actually 91.5% $C_7F_{14}H_2$ and 8.5% $C_7F_{13}H_3$) solvent. The vial was rolled for 3 days at room temperature spreading much of the polymer out on the walls of the vial as a clear swollen film. The solution was decanted off and dried down under pump vacuum overnight along with the vial with the gelled polymer film still on its walls. Residual polymer film on the walls of the vial weighed 0.1001 g and residue from the decanted solution weighed 0.0081 g implying that ~7.5 wt % of the polymer was in solution.

B. Dihydroperfluorononane, $C_9F_{18}H_2$

Glass vials were loaded with 0.2 g polymer and 2 ml of dihydroperfluorononane, $C_9F_{18}H_2$. The vials were rolled for seven days at room temperature with the results recorded in the table below:

TABLE 6

| Polymer | Result |
|---|---|
| Teflon ® AF 2400 | Gel |
| Poly(TFE/PMVE)[1] | Clear, viscous solution |
| Poly(HFP/TFE)[2] | Clear solution |
| Cytop CTX-107[3] | Slightly hazy solution |

Notes to Table 6
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000; $M_n$ = 187,000, $n_{inh}$ = 0.45 dl/g @ 25° C. in FC-75 solvent.
[3]Cytop ® CTX-107 is thought to be a copolymer of tetrafluoroethylene with perfluoro(butenyl vinyl ether)

C. Mixed $C_7F_{14}H_2+C_9F_{18}H_2$

Glass vials were loaded with 0.2 g polymer and 2 ml of dihydroperfluoroheptane, $C_7F_{14}H_2$. The vials were rolled for seven days at room temperature and then when the polymers did not dissolve additional $C_9F_{18}H_2$ was added periodically in 0.1 to 0.2 ml increments until solution was achieved:

TABLE 7

| Polymer | Result |
|---|---|
| Poly(TFE/PMVE)[1] | Solution after addition of 1.1 ml of $C_9F_{18}H_2$ |
| Poly(HFP/TFE)[2] | Most but not all dissolved after addition of 2.3 ml of $C_9F_{18}H_2$ |
| Cytop CTX-107[3] | Slightly hazy solution after addition of 0.7 ml $C_9F_{18}H_2$ |

Notes to Table 7
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000: $M_n$ = 187,000, $n_{inh}$ = 0.45 dl/g @ 25° C. in FC-75 solvent.
[3]Cytop ® CTX-107 is thought to be a copolymer of tetrafluoroethylene with perfluoro(butenyl vinyl ether)

Example 5

$C_7F_{14}H_2+C_9F_{18}H_2+C_{11}F_{22}H_2+C_7F_{13}H_3+C_9F_{17}H_3+C_{11}F_{21}H_3$ $C_7{:}C_9{:}C_{11}$ of 47:47:6 and $H_2$'s:$H_3$'s of ~4:1

Glass vials were loaded with 0.2 g polymer and 2 ml of the above mentioned mixture consisting of $C_7$ to $C_{11}$ perfluorocarbons with 2 to 3 hydrogens per molecule. After rolling the vials for 4 days at room temperature the following solubilities were observed, the mixed solvent here in Example 5 giving faster solution than the pure $C_9$ solvent of Example 4:

TABLE 8

| Polymer | Result |
| --- | --- |
| Teflon ® AF 2400 | Gel |
| Poly(TFE/PMVE)[1] | Clear, viscous solution |
| Poly(HFP/TFE)[2] | Clear solution |
| Cytop CTX-107[3] | Slightly hazy solution |

Notes to Table 8
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000; $M_n$ = 187,000, $n_{inh}$ = 0.45 dl/g @ 25° C. in FC-75 solvent.
[3]Cytop ® CTX-107 is thought to be a copolymer of tetrafluoroethylene with perfluoro(butenyl vinyl ether)

Example 6

Perfluorohexylethylene, $C_6F_{13}CH=CH_2$

Glass vials were loaded with 0.1 g polymer and 1 ml of perfluorohexylethylene, $C_6F_{13}CH=CH_2$. The vials were rolled at room temperature. If solution was not achieved after 1 to 2 days of rolling, additional solvent was added as recorded in the table below:

TABLE 9

| Polymer | Result |
| --- | --- |
| Teflon ® AF2400 | Gel |
| Poly(TFE/PMVE)[1] | Clear solution with 2 ml $C_6F_{13}H$ |
| Poly(HFP/TFE)[2] | Clear solution |
| Cytop CTX-107[3] | Solution |

Notes to Table 9
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000; $M_n$ = 187,000, $n_{inh}$ = 0.45 dl/g @ 25° C. in FC-75 solvent.
[3]Cytop ® CTX-107 is thought to be a copolymer of tetrafluoroethylene with perfluoro(butenyl vinyl ether)

Example 7

Perfluorooctylethylene, $C_8F_{17}CH=CH_2$

A. Demonstration of Broad Solvent Properties for Amorphous Fluoropolymers

Glass vials were loaded with 0.1 g polymer and 1 ml of perfluorooctylethylene, $C_8F_{17}CH=CH_2$. The vials were rolled at room temperature. If solution was not achieved after 1 to 2 days of rolling, additional solvent was added as recorded in the table below:

TABLE 10

| Polymer | Result |
| --- | --- |
| Teflon ® AF 2400 | Thick solution + gel 3 ml $C_8F_{17}CH=CH_2$ |
| Poly(TFE/PMVE)[1] | Clear solution with 2 ml $C_8F_{17}CH=CH_2$ |
| Poly(HFP/TFE)[2] | Clear solution |
| Cytop CTX-107[3] | Solution |

Notes to Table 10
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000: $M_n$ = 187,000, $n_{inh}$ = 0.45 dl/g @ 25° C. in FC-75 solvent
[3]Cytop ® CTX-107 is thought to be a copolymer of tetrafluoroethylene with perfluoro(butenyl vinyl ether)

B. Lower Viscosity at Higher Solids Content with Perflurooctylethylene and Perfluorohexylethylene Fluorinert® FC-40, available from 3M is commonly used to dissolve amorphous fluoropolymers because its high boiling point (149° C.) favors attractive film formation. Teflon® AF 1601, available from E. I. du Pont de Nemours and Company, Wilmington, Del. 19898, solutions were prepared using perfluorooctylethylene ($C_8F_{17}CH=CH_2$), perfluorohexylethylene ($C_6F_{13}CH=CH_2$), and Fluorinert® FC-40 as solvents. Solution viscosities were measured in cps at 22° C. using a Brookfield rotating spindle. FIG. 1 plots the logarithm of viscosity versus solids content for all three solvents. Clearly for the same Teflon® AF 1601 concentration, perfluorooctylethylene and perfluorohexylethyene give much lower viscosities than Fluorinert® FC-40.

One possible consequence of this lower solution viscosity can be seen in spin coating. Solutions were spin coated under ambient laboratory conditions on optical grade polycarbonate disks 2 inches in diameter by 10 mils thick. Coating quality was judged by visual inspection, looking for optical distortion in reflection or transmission. When the solvent was FC-40, good optical quality was observed up to only 12 wt % Teflon® AF 1601, an 18 wt % solution in FC-40 being for example gelatinous and non-uniform. When the solvent was perfluorooctylethylene good optical quality was observed up to 24 wt % Teflon® AF 1601. In the absence of a special effort to control evaporation rate, perfluorohexylethylene tended to give coatings marred by an orange peel thickness distortion.

C. Faster Drying Time and Less Mud Cracking with Perfluorooctylethylene

Inks were prepared by dissolving 939 EW —$SO_2F$ form Nafion® resin in solvent, adding finely divided Pt on carbon in an amount 5× the weight of Nafion®, and finally adding enough additional solvent to give a uniform ink. These inks were then wet cast as 3 mil thick films on Kapton® or glass using a fixed slot coating knife (doctor knife). Repeat coatings were made and dried until a goal ink deposit of 1 mg/cm$^2$ was achieved. When the solvent was perfluorooctylethylene, these films took 12 to 15 minutes to dry as judged by the abrupt transition of the surface from wet/glossy to dry/flat black. The coatings from perfluorooctylethylene were totally crack-free when inspected by optical microscope. When the solvent was Fluorinert® FC-40, the coating took 25 to 30 minutes to dry even though Fluorinert® FC-40 has a boiling point (149° C.) similar to that of perfluorooctylethylene (147° C.). The coating from Fluroinert® FC-40 was observed to have numerous incipient surface cracks.

Example 8

$(C_2F_5)_2C=CHCF_2CF_2CF_3$

Glass vials were loaded with 0.2 g polymer and 2 ml of $(C_2F_5)_2C=CHCF_2CF_2CF_3$. The vials were rolled at room temperature. Solution was achieved after 2 days of rolling at room temperatures as recorded in the table below:

TABLE 11

| Polymer | Result |
| --- | --- |
| Poly(TFE/PMVE)[1] | Solution with trace haze |
| Poly(HFP/TFE)[2] | Clear solution |
| Cytop CTX-107[3] | Solution with trace haze |

Notes to Table 11
[1]Poly(TFE/PMVE), iodine ended tetrafluoroethylene/perfluoro(methyl vinyl ether copolymer)
[2]Poly(HFP/TFE): 56.6 wt % HFP; $M_w$ = 338,000; $M_n$ = 187,000, $n_{inh}$ = 0.45 dl/g @ 25° C. in FC-75 solvent.
[3]Cytop ® CTX-107 is thought to be a copolymer of tetrafluoroethylene with perfluoro(butenyl vinyl ether)

Example 9

60.5 wt % TFE/29.0 wt % PMVE/10.8 Wt % Terpolymer

Glass vials were loaded with 0.1 g polymer and 2 ml of the solvents listed below. The contents of the vials stirred magnetically for several days while maintaining at 50° in a water bath with the results listed below:

TABLE 12

| Solvent | Result |
|---|---|
| $F(CF_2)_8H$ | Hazy solution that forms loose liquid gel on cooling to room temperature |
| $C_8F_{17}CH=CH_2$ | Hazy solution with perhaps a trace of gel on cooling to room temperature |
| $C_9F_{18}H_2$ | Hazy solution with some gel |

What is claimed is:

1. A liquid/gelatinous composition of matter comprising:
   (a) a solvent or a mixture of solvents selected from the group consisting of:
      (i) a $C_nF_{2n+2-x}H_x$ compound, wherein n is an integer from 6 to 15 and x is an integer from 1 to 3; and
      (ii) a $C_{n'}F_{2n'-x'}H_{x'}$ compound, wherein n' is an integer from 7 to 15 and x' is an integer from 1 to 3; and
   (b) one or more amorphous fluoropolymers selected from the group consisting of:
      (i) poly(HFP/TFE);
      (ii) iodine ended poly(TFE/PMVE);
      (iii) poly(TFE/PMVE/PEVE);
      (iv) poly(TFE/PDD);
      (v) poly(TFE/perfluorovinylether);
      (vi) poly($CF_2=CF(CF_2)_2OCF=CF_2$/TFE); and (vii) 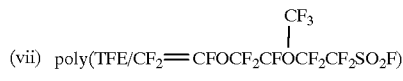

wherein the amorphous fluoropolymer has no detectable Tm(<1 J/g) by differential scanning calorimetry and wherein the amorphous fluoropolymer makes up 0.05 to 30 wt % of the composition and wherein at least 5% of the amorphous fluoropolymer present is in solution in the solvent or mixture of solvents.

2. The composition of claim 1 wherein the $C_nF_{2n+2-x}H_x$ compound is selected from the group consisting of
   (i) a $CF_3(CF_2)_mH$ compound, wherein m is an integer from 5 to 9; and
   (ii) a $F(CF_2)_q(CFHCFH)(CF_2)_rF$ compound, wherein q and r are each integers such that the sum q+r is equal to 5 to 13.

3. The composition of claim 1 wherein the $C_{n'}F_{2n'-x'}H_{x'}$ compound possesses a carbon-carbon double bond and the hydrogen(s) are attached to the olefinic carbon atoms.

4. The composition of claim 3 wherein the $C_{n'}F_{2n'-x'}H_{x'}$ compound is selected from the group consisting of
   (i) a $C_{m'}F_{2m'+1}CH=CH_2$ compound, wherein m' is an integer from 6 to 12;
   (ii) a $(C_2F_5)_2C=CH(CF_2)_sCF_3$ compound, wherein s is an integer from 2 to 4; and
   (iii) a $F(CF_2)_{q'}CH=CH(CF_2)_{r'}CF_3$ compound, wherein q' and r' are each integers such that the sum q'+r' is equal to 8 to 12.

5. The composition of claim 1 wherein the amorphous fluoropolymer makes up 0.5 to 10 wt % of the companion.

6. The composition of claim 2 wherein the amorphous fluoropolymer makes up 1 to 5 wt % of the composition.

7. A coated item comprising a thin film of the composition of claim 1.

8. The liquid/gelatinous composition of matter of claim 1 wherein the one or more amorphous fluoropolymers is selected from the group consisting of:
   (i) poly(HFP/TFE);
   (ii) iodine ended poly(TFE/PMVE);
   (iii) poly(TFE/PMVE/PEVE);
   (v) poly(TFE/perfluorovinylether); and (vii) 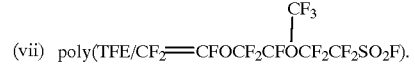

* * * * *